United States Patent
Beersma et al.

[15] 3,640,756
[45] Feb. 8, 1972

[54] REMOISTENABLE PREGUMMED PRODUCTS

[72] Inventors: Pieter Johannes Adrianus Beersma, Haren (Gr.); Albert Hendrik Veening, Sappemeer, both of Netherlands

[73] Assignee: Scholten Research N.V., Groningen, Netherlands

[22] Filed: Oct. 28, 1968

[21] Appl. No.: 771,307

[30] Foreign Application Priority Data

Oct. 31, 1967 Great Britain .....................49,312/67

[52] U.S. Cl. ...............................117/76 A, 117/21, 117/33, 117/84, 117/122 S, 117/156, 117/165
[51] Int. Cl. ........................................C09j 7/04, A61l 15/00
[58] Field of Search .................117/76 A, 84, 122 S, 33, 21, 117/165, 156

[56] References Cited

UNITED STATES PATENTS

| | | |
|---|---|---|
| 2,766,688 | 10/1956 | Halpern et al. .....................117/84 X |
| 2,793,966 | 5/1957 | Davis.....................................117/122 |
| 3,036,935 | 5/1962 | Lolkema et al. ..................117/165 X |
| 3,093,504 | 6/1963 | Bode................................117/165 X |
| 3,137,588 | 6/1964 | Taylor et al.......................117/165 X |
| 3,143,518 | 8/1964 | Smith et al.......................117/122 X |
| 3,257,225 | 6/1966 | Marrota et al. .....................117/122 X |
| 3,269,855 | 8/1966 | Moes et al.........................117/165 X |
| 3,376,623 | 4/1968 | Katzbeck et al. ..................117/165 X |

Primary Examiner—William D. Martin
Assistant Examiner—Bernard D. Pianalto
Attorney—Wenderoth, Lind & Ponack

[57] ABSTRACT

The object of the invention is a remoistenable product comprising a substrate, e.g. paper or paperboard, an adhesive consisting of a high molecular weight polymeric binding agent and a remoistenable amylaceous adhesive said product being characterized in that the amylaceous adhesive is a dry, cold water swelling, cross-linked, granular starch ester or starch ether containing hydrophilic substituents, the granules of said starch product being in discrete, nonagglomerated form.

8 Claims, No Drawings

REMOISTENABLE PREGUMMED PRODUCTS

This invention relates to pregummed products having thereon an adhesive coating of the remoistenable type and to methods of producing the same. More particularly it relates to pregummed hanging papers, such as wall papers, poster papers and bill board papers.

In the production of remoistenable pregummed products, such as wall paper, poster papers, bill board paper, labels, tapes and similar products, the back side of the substrate is coated with a dry adhesive film which on being remoistened with water will become tacky and must readily adhere to concrete, plaster, wood, paper and similar undergrounds.

It is common practice in the manufacture of remoistenable pregummed products to prepare an aqueous solution of one or more adhesives, such as starch, dextrine, glue or natural gums, and to apply the adhesive solution as a film to the back surface of the substrate and drying the thus coated product. The resulting pregummed adhesive film should on remoistening with water produce the desired tackiness and adhesion.

It has further been proposed to manufacture remoistenable pregummed products by applying an adhesive film to the back side of a substrate, which adhesive film consists of discrete particles of a remoistenable adhesive which are attached to the substrate and to each other by means of a binding agent.

The manufacture of this type of adhesive film may be accomplished by a variety of methods. The binding agent may, for instance be dissolved in a volatile solvent that is not a solvent for the remoistenable adhesive. The latter is mixed in particle form with the solution of the binding material to form a suspension; this suspension is applied to the back surface of a substrate and the volatile solvent is evaporated. In a further method of carrying out the above pregumming process the substrate is first coated with a tacky film of a binding agent, for instance by application of a solution of the binding agent. A remoistenable adhesive in powdered form is then dusted over the moist film, after which the coated substrate is dried. In still another method for pregumming substrates in the above way a binding agent is used which fuses on application of heat or on exposure to the vapor of certain solvents, which treatments should not affect the remoistenable adhesive particles. Thus a mixture of the binding agent and the remoistenable adhesive in essentially dry powder form is coated on the substrate and the powdered coating is subjected to a treatment which will fuse the binding agent while maintaining the powdered remoistenable adhesive as discrete particles bound therein.

Among the materials that have been proposed as the particulate, remoistenable adhesive are included: natural gums such as gum arabic, gum tragacant, locust bean gun, tamarind seed powder, alginates and the like; proteinaceous material such as animal glue, casein and the like; cellulose derivatives such as methyl cellulose, carboxymethyl, cellulose, hydroxyethyl cellulose and the like; synthetic resins such as polyvinylalcohol, polyacrylamide, polyethylene oxide and the like; amylaceous materials, such as pregelatinized starches, starch ethers, starch esters, dextrines and the like.

For use as a binding agent in the above pregumming methods various high molecular weight polymeric materials which adhere to the substrate have been proposed. Exemplary of these polymeric materials are water soluble or water insoluble compounds, such as amylaceous materials, cellulose derivatives, natural gums, rosins, shellac, vinylacetate homo- and copolymers, polyvinyl alkyl ethers, polyethylenes, polyisobutylenes, butadiene styrene copolymers, butadiene acrylonitrile copolymers and the like.

Products which were pregummed in the above way with particles of a remoistenable adhesive retained by a layer of binding agent have usually proved unsatisfactory, mostly because the particles of the adhesive did not take up sufficient water and swell in the desired time and to the desired extent, and when remoistened did not regain the desired tackiness. Moreover the hitherto known gummed products in the remoistened state did not possess the slip characteristics which are desired for the proper hanging of products such as wall paper, poster paper and bill board paper.

It is an object of this invention to provide improved remoistenable pregummed products and methods of manufacturing the same.

It is another object of this invention to provide improved pregummed hanging paper, which possesses good remoistening properties, tackiness and slip characteristics, so that it may be readily hung in the right position.

A further object of this invention is to provide remoistenable pregummed products having excellent remoistening properties and which will readily adhere to concrete, plaster, wood, paper and the like.

Other objects and advantages of this invention will be apparent from the following description.

The invention is concerned with remoistenable pregummed products comprising a substrate, and adhesive layer consisting of a high molecular weight polymeric binding agent and a remoistenable amylaceous adhesive, which are characterized in that the amylaceous adhesive is a dry, cold water swelling, cross-linked, granular starch ester or starch ether containing hydrophilic substituents the granules of said starch product being in discrete, nonagglomerated form.

The invention is also concerned in the process for manufacturing said remoistenable pregummed products.

We have discovered that the pregummed products containing cold water swelling starch esters or starch ethers of this character have improved remoistening, adhesive and slip properties.

We preferably use starch esters or ethers which still possess the polarization cross between crossed nicols, but which are capable of swelling in water of room temperature to such an extent, that substantially all starch granules have lost their polarization cross but that they do not disintegrate and dissolve.

In the conventional pregelatinized starches the granular structure is disrupted and the starch material is dispersed. On moistening with water they tend to absorb water very quickly and irregularly and they will dissolve in uncontrolled manner. We have discovered that the starch esters or ethers used according to the invention when moistened with water will absorb the water more slowly and in controlled manner to the desired extent without disintegrating and dissolving. It is believed that this is due to the fact that said starch esters or ethers have the original granular form and have been cross-linked to a certain degree. The extent to which they swell is regulated by the degree of cross-linking. In general this degree of cross-linking must be in the range of from one cross-link per about 1,000 anhydroglucose units to one cross-link per about 50 anhydroglucose units. Less cross-linking results in too much swelling and dissolving, while more cross-linking will inhibit swelling too much.

The cold water swelling, cross-linked starch esters or ethers still possessing the original discrete granular structure must contain hydrophilic substituents, such as phosphate, sulfate, carbamate or carboxyacyl ester groups or carboxyalkyl, sulfoalkyl, hydroxyalkyl, aminoalkyl or substituted aminoalkyl ether groups. Exemplary of the reagents which may introduce these hydrophilic substituents in the starch molecule are phosphorus containing acids, water soluble salts of phosphorus containing acids, sulfamic acid, sulfur trioxide-tertiary amine complexes, chlorosulfonic acid, urea, anhydrides of dibasic carboxylic acids, sodium haloacetates, acrylic acid esters, haloalkylsulfonates, sultones, alkylene oxides, alkylene halohydrins, ethylene imine, substituted aminoalkyl halides and substituted aminoalkyl epoxides. The granular starch derivatives must contain sufficient hydrophilic groups to be cold water swelling. This property is generally obtained at a degree of substitution (D.S.) higher than about 0.1.

In general any reagent capable of reacting with two or more hydroxyl groups in the starch molecules can be used as cross-linking agents in the manufacture of the cold water swelling starch esters or starch ethers according to our invention.

Exemplary of suitable cross-linking agents are phosphorus oxychloride, water soluble trimetaphosphate salts, diepoxides, epihalohydrins, aldehydes, dialdehydes, dimethylolurea, dimethylolethylene urea, methylolmelamines and 1, 3, 5, trichlorotriazine.

Depending on the reaction conditions, such as the pH and temperature, some of the above reagents may react with the starch so as to introduce both hydrophilic substituent groups into and/or cross-links between the molecules. For instance, trimetaphosphates form almost exclusively cross-links at alkaline pH values while at acid pH values the simple starch monophosphate esters are formed. On the other hand urea at temperatures up to about 120° C. reacts as a monofunctional esterifying agent, whereas at temperatures of about 120° C. and higher cross-linked starch derivatives are formed.

The cross-linked starch derivatives of our invention still possess the original discrete granular structure. All the reactions, in particular the etherification or esterification, therefore must be performed in such a way that the granule structure of the starch remains intact. This may be obtained by derivatizing the starch in suspension in a liquid while maintaining the granular form. The introduction of the hydrophilic groups into the starch molecules must take place in a nonsolvent as the reaction medium. As such water miscible organic solvents containing minor amounts of water may be used. Alternatively starch may be derivatized while keeping the starch granules intact by reacting a mixture of starch, the derivatizing agent and, if necessary, a catalyst in a substantially dry state. Whereas in some types of reactions, such as heating operations at temperatures above 100° C., the presence of moisture is undesirable, in other cases the presence of 5–20 percent moisture based on the starch is often essential. Both processes are indicated as substantially dry reactions. The cross-linking reaction and the etherification or esterification reaction may be performed simultaneously or one after the other, in any desired order.

The cold water swelling starch derivatives may be prepared from all types of granular starches such as corn starch, wheat starch, waxy maize starch, high amylose corn starch, potato starch, sago starch or tapioca starch. These starches may be submitted to other chemical modifications, provided that they still retain the original granule structure of the parent starch. The term "starches" as used here does not only include purified starches, but also protein containing starches, such as flour. We preferably use a cold water swelling, cross-linked starch ester which has been produced by heating a substantially dry mixture of starch, a free or partially neutralized phosphorus containing acid and urea to temperatures ranging from about 120°C. to about 180°C.

The remoistenable pregummed products according to the invention may be produced in a variety of ways. Any method by which the cold water swelling, cross-linked starch esters or ethers containing hydrophilic substitutents are attached in the form of particles to a substrate by means of a high molecular weight polymeric material may be used.

According to one method the substrate, e.g., hanging paper, is coated on the rear surface with a layer of a dissolved or fused high molecular weight polymeric material, whereupon the cold water swelling, cross-linked starch derivatives are deposited thereon, while the polymeric material is still in a tacky state. When using the prepared starch esters of ethers of our invention, which swell in cold water without disintegration of the swollen granules, the solvent for the high molecular weight polymeric material may partially or completely consist of water.

According to another method the high molecular weight polymeric material is dissolved in a solvent which does not swell or dissolve the starch derivative. The latter is suspended in the solution of the polymeric material and the suspension is applied to the rear of the substrate.

According to still another method the substrate is coated with a powdered mixture of the starch derivative and the polymeric material, whereupon the polymeric material is fused by exposure to heat or to vapor of certain solvents.

In all these cases the treated substrate is dried or cooled, leaving a thin layer of polymeric material and permanently attached thereto a layer of the remoistenable starch derivative in particulate form.

The granular starch derivatives can be easily and uniformly applied to the surface to be coated. For practical purposes a minimum of 5 grams per m.$^2$ of the surface of the substrate should be applied. Drying of the pregummed products is also very easy. The presence of minor amounts of water in the production of the gum layer is not detrimental for maintaining the cold water swelling starch derivative used according to the invention in separate particle form in the gum layer, as would be the case with the starch products which were hitherto used in the manufacture of particulate, pregummed products. The latter products will in the presence of water swell and dissolve and thereby form a continuous adhesive layer. Pregummed hanging papers of this type will have a strong tendency to curl. The granular, cross-linked starch derivatives of our invention will swell in the presence of water but not loose their individuality, so that an uncoalesced film results, which will not curl. The same holds true when the pregummed products are exposed to conditions of high humidity.

The properties of the remoistenable pregummed products may be modified by incorporating into the layer, preferably by addition to the binding agent, of suitable compounds such as plasticizers for the high molecular weight polymeric binding agents humidity controlling agents, preserving agents, wetting agents, bentonites or other colloidal clays, resin precondensates and the like.

The remoistenable pregummed products in particular pregummed hanging papers, according to the invention, when wetted with water, for instance by means of a rotating roll, exhibit desirable remoistening properties. When applied in the wet state to a wall, consisting e.g., of concrete, plaster, wood or paper, they have sufficient tackiness. The slip characteristics are so that the paper may be readily moved on the wall to the right position. Once adjusted to this position the adhesive layer will dry in due time without producing wrinkles. The ultimate adhesion to the wall is perfect, even on rough surfaces.

The following examples will further illustrate the embodiment of our invention.

Example I

The rear surface of a wall paper having a weight of 190 g. per m.$^2$ is coated with a 1 percent aqueous solution of sodium carboxymethyl cellulose.

A granular cold water swelling, starch phosphate is prepared by heating potato starch, phosphoric acid and urea in a substantially dry state for 1 hour to a temperature of 150° C. so as to obtain a cross-linked starch phosphate having a D.S. of 0.2, which still presents the polarization cross between crossed nicols, but which is capable of swelling in water of room temperature to such an extent, that substantially all starch granules have lost their polarization cross that they do not disintegrate and dissolve. While the coated wallpaper is still wet the starch phosphate is dusted through a 200 mesh sieve upon the adhesive layer. The coated material is dried and excess starch particles are wiped from the paper.

The pregummed wall paper is remoistened by contacting with water by means of a rotating roll and the paper is applied to a plastered wall. After moving the paper in the right position it is left to dry. After a period of 20 minutes the adhesive layer is sufficiently dry. The wall paper adheres tenaciously and smoothly to the plastered wall, no wrinkles having been formed.

Similar results are obtained when the starch ester is applied to the rear surface of the wall paper while being suspended in a 2 percent solution of cellulose acetate in acetone or in 2 percent solution of ethyl cellulose in a mixture of 85 percent ethyl alcohol and trichloroethylene.

Example II

The rear surface of a wall paper of 100 g. per m.² is coated with a 3 percent solution of polyvinyl alcohol in aqueous ethylalcohol (60 percent).

A dry cold water swelling, cross-linked, granular starch carboxymethylether having a D.S. of 0.3 is dusted upon the polyvinyl alcohol layer while the latter is still wet. The starch carboxymethylether has been manufactured by treating granular corn starch in the presence of an alkaline catalyst in methylalcohol (90 percent) with 0.1 percent epichlorohydrin and 30 percent of the sodium salt of monochloracetic acid. It is capable of swelling in water of room temperature without disintegrating and dissolving. After the wall paper is dried and excess starch particles are removed, a pregummed layer of remoistenable adhesive is obtained which becomes tacky on being moistened with water. It adheres well to all kinds of bases, such as concrete, plaster, wood or paper.

We claim:

1. A remoistenable pregummed product which comprises a substrate coated with a layer of a high molecular weight polymeric binding agent and adsorbed on this layer are particles of a cold water swelling starch ether or starch ester containing hydrophilic substituents, said starch particles consisting of a chemically cross-linked granular starch ether or starch ester containing hydrophilic substituents in which the degree of substitution of the cross-linking groups in the cross-linked granular starch ether or ester containing hydrophilic substituents is within the range of from 0.001 to 0.02.

2. The product of claim 1 in which the degree of substitution of the hydrophilic groups in the chemically cross-linked granular starch ether or ester containing hydrophilic substituents is at least 0.1.

3. The product of claim 1 in which the chemically cross-linked granular starch ester containing hydrophilic substituents is a cross-linked granular starch phosphate ester obtained by reacting granular starch, a phosphorus containing acid and urea.

4. The product of claim 1 in which the chemically cross-linked granular starch ether containing hydrophilic substituents is a granular carboxymethyl ether of starch, cross-linked with epichlorohydrin.

5. The product of claim 1 in which the chemically cross-linked granular starch ether or ester containing hydrophilic substituents consists of granules which present between crossed nicols a polarization cross, and which swell upon moistening with water of room temperature to such an extent that substantially all granules loose their polarization cross, but do not disintegrate and dissolve.

6. The product of claim 1 in which the substrate is paper.

7. The product of claim 1 in which the substrate is wall paper.

8. The product of claim 1 wherein the chemically cross-linked starch ether or starch ester is cross-linked with a member selected from the group consisting of phosphorus oxychloride, water-soluble trimetaphosphate salts, diepoxides, epihalohydrins, aldehydes, dialdehydes, dimethylolurea, dimethylol-ethylene urea, a methylolmelamine and 1,3,5-trichlorotriazine.

* * * * *